United States Patent
Giannini et al.

[11] Patent Number: 5,885,522
[45] Date of Patent: Mar. 23, 1999

[54] METHOD AND APPARATUS FOR HEAT TREATING AND STRAIGHTENING STRUCTURAL MEMBERS

[75] Inventors: Angelo A. Giannini, Youngstown; George Satava, Hudson; Ronald Szelesta, Strongsville, all of Ohio

[73] Assignee: Midland Steel Products Co., Cleveland, Ohio

[21] Appl. No.: 713,165

[22] Filed: Sep. 12, 1996

[51] Int. Cl.$^6$ ................................................. C21D 11/00
[52] U.S. Cl. ............................ 266/90; 266/259; 148/646
[58] Field of Search .................... 266/249, 259, 266/90, 78, 99; 148/567, 646

[56] References Cited

U.S. PATENT DOCUMENTS

| | | | |
|---|---|---|---|
| 3,148,093 | 9/1964 | Williams et al. | 148/131 |
| 3,294,597 | 12/1966 | Kuchera | 148/131 |
| 3,352,724 | 11/1967 | McNitt et al. | |
| 3,423,254 | 1/1969 | Safford et al. | 148/131 |
| 3,489,620 | 1/1970 | Current | 148/146 |
| 3,986,710 | 10/1976 | Day et al. | 266/259 |
| 4,111,025 | 9/1978 | Nakajima et al. | |
| 4,142,923 | 3/1979 | Satava | 148/131 |
| 4,394,194 | 7/1983 | Satava et al. | 148/131 |
| 4,486,249 | 12/1984 | Woodings | 148/154 |
| 4,749,419 | 6/1988 | Sommer et al. | 148/146 |

FOREIGN PATENT DOCUMENTS

4003258 A  8/1991  Germany .

OTHER PUBLICATIONS

Daido Kikai Seisakusho, *Patent Abstracts of Japan*, vol. 017, No. 645 (M–1517), Nov. 30, 1993.

Axel Maag, et al., *Stahl Und Eisen*, Einflub der Richparameter auf dis Anlagenbelastung and die Produktqualitat beim Richten warmgewalzter Profile, vol. 110, No. 2, Feb. 14, 1990, pp. 89–99.

*Primary Examiner*—Scott Kastler
*Attorney, Agent, or Firm*—Benesch, Friedlander, Coplan & Aronoff LLP

[57] ABSTRACT

An apparatus (20) for induction heat treating, restraint quenching, and straightening an associated carbon steel truck structural member (30), having a web (32) and at least one flange (34) substantially perpendicular thereto, comprises a heat treating apparatus (22) for induction heating and restraint quenching the associated structural member (30). The heat treating apparatus (22) is operatively connected to a cooling conveyor (50). The cooling conveyor (50) is adapted for receiving the associated structural member (30) from the heat treating apparatus (22). A testing apparatus (24) is included for hardness testing the heat treated associated structural member. The testing apparatus (24) is adapted for receiving the associated structural member (30) from the cooling conveyor (52). A conveyor (54) is adapted for receiving the associated structural member (30) from the testing apparatus (24). A roller straightener (26) is operatively connected to the conveyor (54). The roller straightener (26) is adapted for receiving the associated structural member (30) from the conveyor (54). The roller straightener (26) has at least three rolls (64*b*, 64*c*, 64*d*) proximately located to one another for operatively engaging the associated structural member (30) between the rolls. The roller straightener (26) further includes an apparatus (78) for adjusting the position of at least one of the rolls (64) along a first axis.

13 Claims, 5 Drawing Sheets

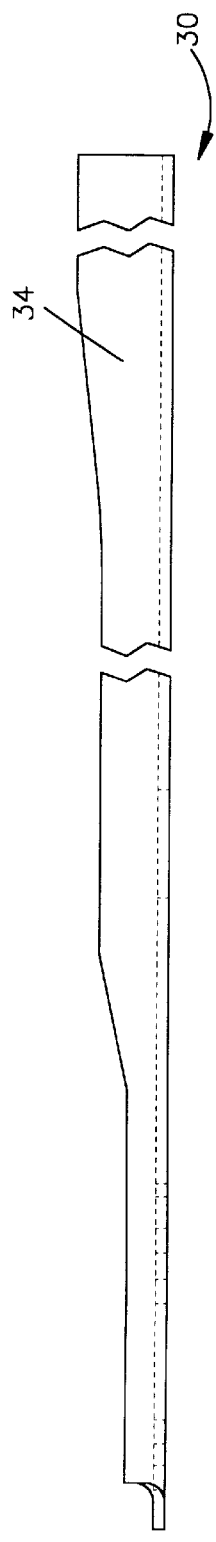
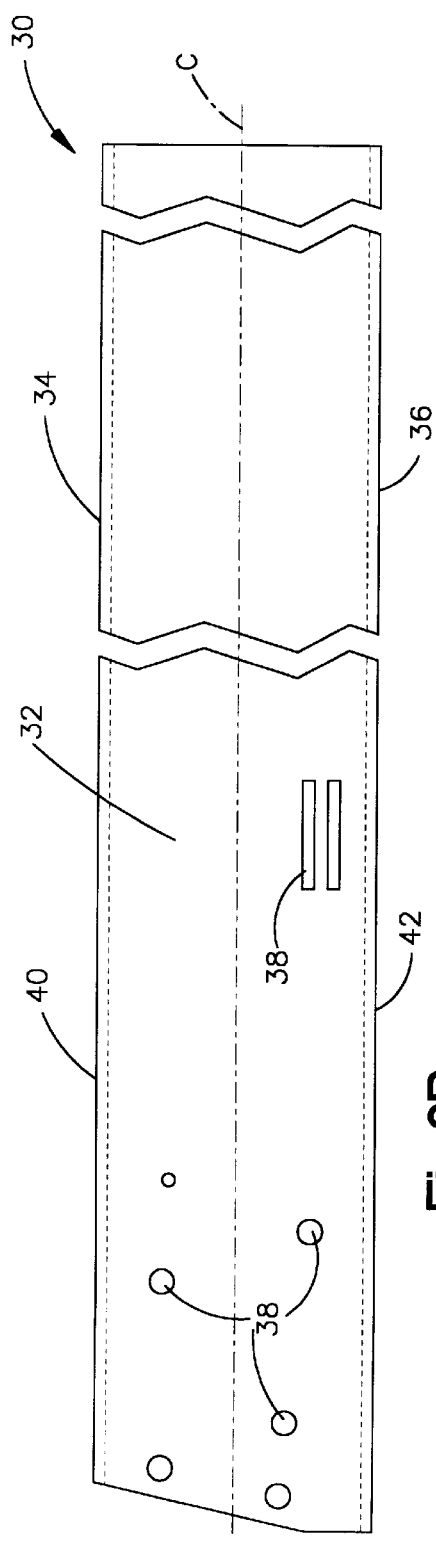
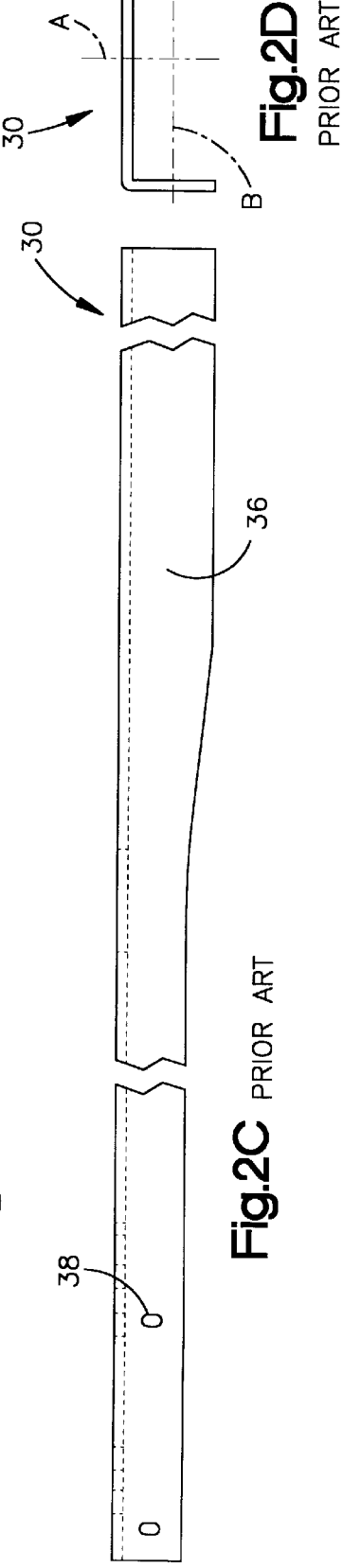
Fig.2A PRIOR ART
Fig.2B PRIOR ART
Fig.2C PRIOR ART
Fig.2D PRIOR ART

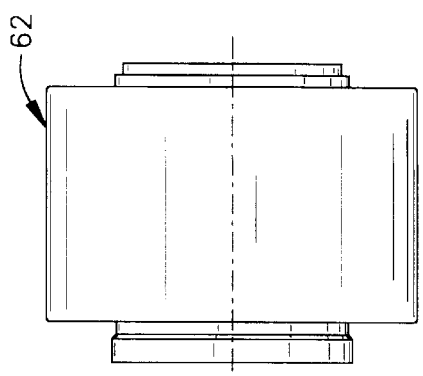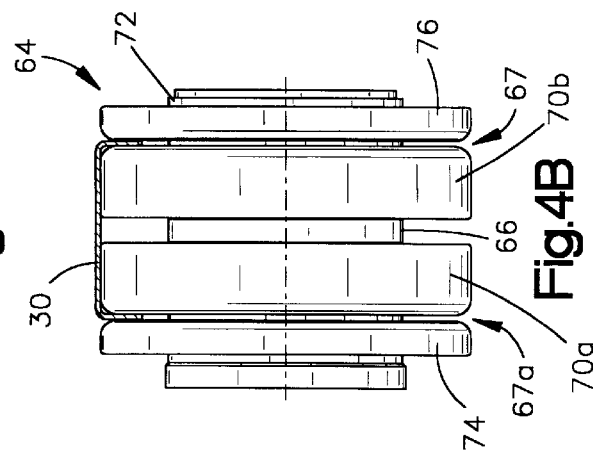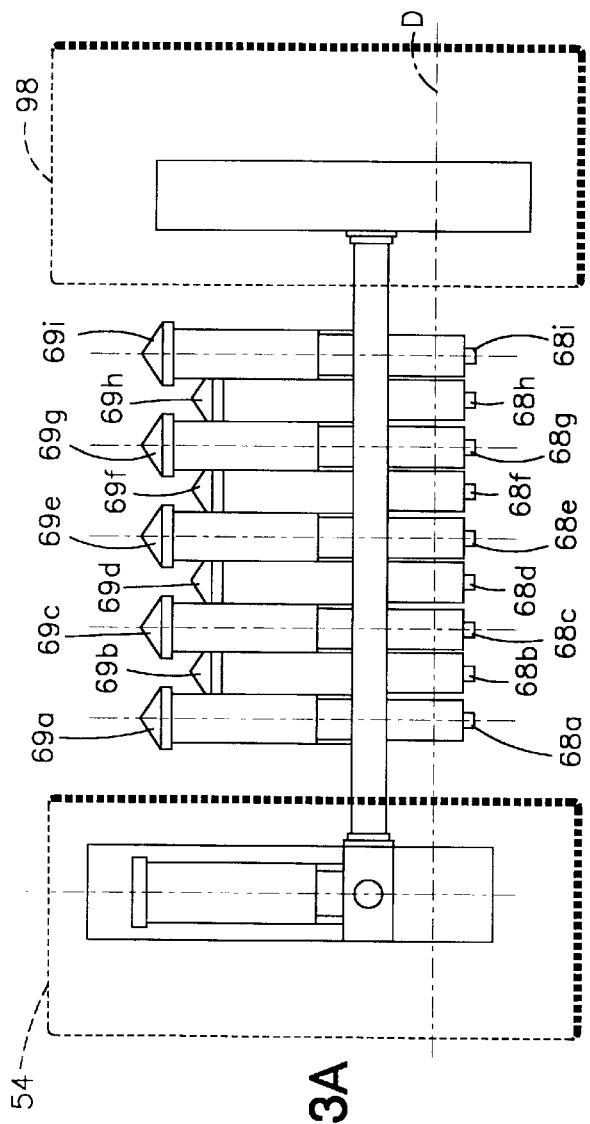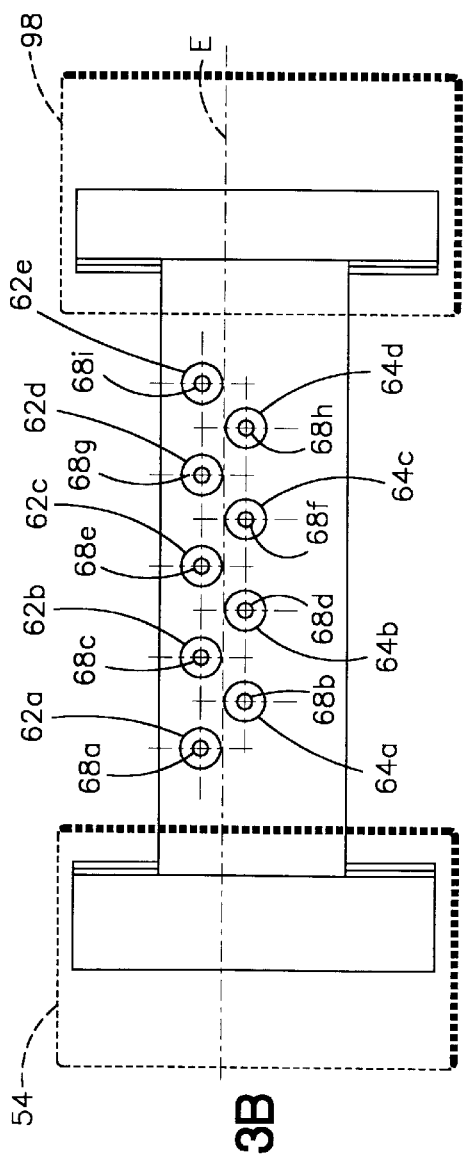

METHOD AND APPARATUS FOR HEAT TREATING AND STRAIGHTENING STRUCTURAL MEMBERS

TECHNICAL FIELD

The present invention is directed to a method and apparatus for induction heat treating, restraint quenching, and straightening channel shaped structural rail members for trucks and is particularly directed to a method and apparatus for both (i) reducing distortions in the rail during heat treating that result from heat treating, and (ii) removing bow, camber, and flange angle distortions in a single striaghtening operation, that remain in the rail after induction heat treating and restraint quenching of the truck structural members.

BACKGROUND OF THE INVENTION

Specialized heat treating of carbon steel structural members is used to produce desired physical properties in truck side rails. The strength of the rail section and the payload capacity of the truck are increased while reducing the weight of the truck, thereby improving the energy efficiency of the truck. Typically, the structural members are channel shaped having a web portion and at least one flange portion.

The truck side rails are generally long structural members 9 feet to 40 feet in length and 0.210 inch to 0.395 inch thick. Due to the use of carbon steel, a rapid effective quench is necessary to obtain the desired physical properties and microstructure of the steel. Truck rails are long, thin section members that are generally cold formed into their channel shape from a flat strip. Cold roll forming causes considerable residual stresses to be present in the steel due to the forming operation. During heat treating and rapid quenching of these thin section members, substantial distortion occurs due to the interaction of the residual stresses and the severe thermal action of the heat treat and quench. The distortion of the rails is evident in the structural member as bow, camber, and flange angle deviation. Referring to FIG. 2D, for a structural channel member having the web in a horizontal orientation and the flanges extending vertically downward (i) bow distortion is a curved distortion in the channel member along a vertical axis A as viewed in FIG. 2D, (ii) camber distortion is a curved distortion along a horizontal axis B, and (iii) flange angle distortion is an angular deviation of the flange from a generally perpendicular angle with the web, as illustrated by the angle Θ. The amount of the three types of distortion described above varies along the length of the structural member.

Improvements in induction heat treating using restraint quenching have reduced and controlled some bowing and camber distortion. However, even with the reduced distortion provided by currently available induction heat treat and restraint quench methods, the rails still have residual amounts of distortion that requires additional labor intensive straightening to provide structural members that meet customer specifications. After induction heat treating and restraint quenching, a rail member may have up to 2.5 feet of bow distortion and up to ¾ inch camber distortion over the length of the structural member. Typical distortion values are 12 inches of bow and ½ inch camber distortion. In addition, the flange angles between each flange and the web deviate outside of an acceptable range of 89° to 91°.

Typically, a debow operation is used to remove bow in the structural member and a V-die operation is used to bring the flange angle within the acceptable range. Currently, camber distortion is not corrected. The debow operation is a manual and labor intensive operation. The structural member is stepwise fed, flanges down, through a flat die in a bump press. Every 18 inches a downward hit is made on the web of the channel shaped rail, thereby pushing the web in a direction opposite that of the bow distortion. The bump press operation is inconsistent and does not always remove the bow distortion sufficiently to produce structural members conforming to customer specifications. The non-conforming structural members are subsequently scrapped. The labor intensive incremental processing of each rail substantially delays processing and production of structural members.

The flange angle is corrected using an additional manual, labor intensive press operation. The inner radius of a flange and the web is set in a V-die in a press. The inverted section of the V-die is projected in to the radius when a hit is made by the press. The V-die is set at 90° to bring the flange within the acceptable range. The V-die press operation does not provide consistent results since the die only corrects flange angle in 24 inch sections. Furthermore, the structural members range in length from 9 feet to 40 feet and the V-die press does not provide consistent correction of flange angle for the entire length of the rail sections. In addition, only one flange is processed at a time, thus adding time and labor to the processing of each structural member with this manual operation.

The labor intensive manual straightening operations described above have long been the only method for correcting bow and flange angle distortion in this industry. The delay in processing structural members caused by the manual operations have considerable impact on efficient and cost effective production of structural members. Specifically, since the straightening operations are labor intensive and time consuming, additional shifts of workers must be scheduled to process heat treated rails.

It is desirable to remove residual bow, camber, and flange angle distortion that remain after induction heating and restraint quenching to produce structural members for truck side rails that (i) meet customer specifications, and (ii) process the structural members in line with the heat treat system at a production rate compatible with that of the heat treat process.

SUMMARY OF THE INVENTION

Still other advantages and benefits of the invention will become apparent to those skilled in the art upon a reading and understanding of the following detailed description. The present invention provides a method and apparatus for induction heat treating, restraint quenching, and straightening channel shaped structural rail members in line at compatible production rates.

An apparatus in accordance with the invention for induction heat treating, restraint quenching, and straightening an associated carbon steel truck structural member, having a web and at least one flange substantially perpendicular thereto, comprises a heat treating means for induction heating and restraint quenching the associated structural member. The heat treating means is operatively connected to a cooling conveyor. The cooling conveyor is adapted for receiving the associated structural member from the heat treating means. A testing means is included for hardness testing the associated heat treated structural member. The testing means is adapted for receiving the associated structural member from the cooling conveyor. A conveyor means is adapted for receiving the associated structural member from the testing means. A roller straightener means is operatively connected to the conveyor means. The roller straightener means is adapted for receiving the associated structural member from the conveyor means. The roller straightener means has at least three rolls proximately located to one another for operatively engaging the associated structural member between the rolls. The roller straightener means further includes means for adjusting the position of at least one of the rolls along a first axis.

In accordance with a preferred embodiment of the present invention, the roller straightener means includes (i) means for adjusting the position of at least one of the rolls along a first axis and means for adjusting the position of at least one of the rolls along a second axis. Each of the first and second axis are complementary to one another.

Another feature of the apparatus of the present invention includes a controller means adapted for providing a control signal to the means for adjusting the position of the at least one of the rolls along said first axis.

Yet another feature of the apparatus of the present invention includes a micro controller which includes memory means for storing data representative of a desired position of at least one of the rolls along the first axis.

Another feature of the apparatus of the present invention includes a shot peen apparatus for surface hardening the associated structural member.

A method in accordance with the present invention for induction heat treating, restraint quenching, and straightening an associated carbon steel truck structural member having a web and at least one flange substantially perpendicular thereto comprises the steps of heat treating and restraint quenching the associated structural member with an induction heat treating operation. The method includes the steps of depositing the associated structural member on a cooling conveyor and receiving the associated structural member from the cooling conveyor at a hardness testing station. The structural member is hardness tested. The method further comprises the steps of depositing the structural member on a conveyor adapted for receiving the structural member after the step of hardness testing. The method includes receiving the associated structural member from the conveyor at a roller straightener. The roller straightener has at least three rolls proximately located to one another for operatively engaging the structural member between the rolls. The structural member is straightened in the roller straightener once received from the conveyor.

In accordance with a preferred embodiment of the present invention the step of straightening includes adjusting the position of at least one of the rolls along a first axis and adjusting the position of at least one of the rolls along a second axis. Each of the first and second axis are oriented complementary to one another.

Another feature of the method of the present invention further includes the step of providing a control signal from a microcomputer for adjusting the position of at least one of the rolls along the first axis.

Yet another aspect of the method of the present invention includes storing data representative of one of a plurality of positions of at least one of the rolls along the first axis.

Yet another aspect of the method of the present invention further includes the step of shot peening the structural member to surface harden the structural member by introducing compressive stress in the structural member.

The advantages of present invention addresses a long felt need in the truck rail industry to provide a structural member heat treating and straightening process that economically processes heat treated rails at a production rate compatible with the production rate of an induction heat treating system.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 2A is a side view of a typical prior art structural member processed in the present invention;

FIG. 2B is a top view of a typical prior art structural member processed in the present invention;

FIG. 2C is another side view of the prior art structural member;

FIG. 2D is an end view of a prior art structural member;

FIG. 3A is a schematic top view of a roller straightener for use in the production line of FIG. 1;

FIG. 3B is a schematic representation of a side view of a roller straightener for use in the production line of FIG. 1;

FIG. 4A is a front elevation view of a power roll for use in the roller straightener of FIGS. 3A–3B;

FIG. 4B is a front elevation view of a tooling roll for use in the roller straightener of FIGS. 3A–3B;

DETAILED DESCRIPTION OF THE PREFERRED EMBODIMENT

Figure 1:
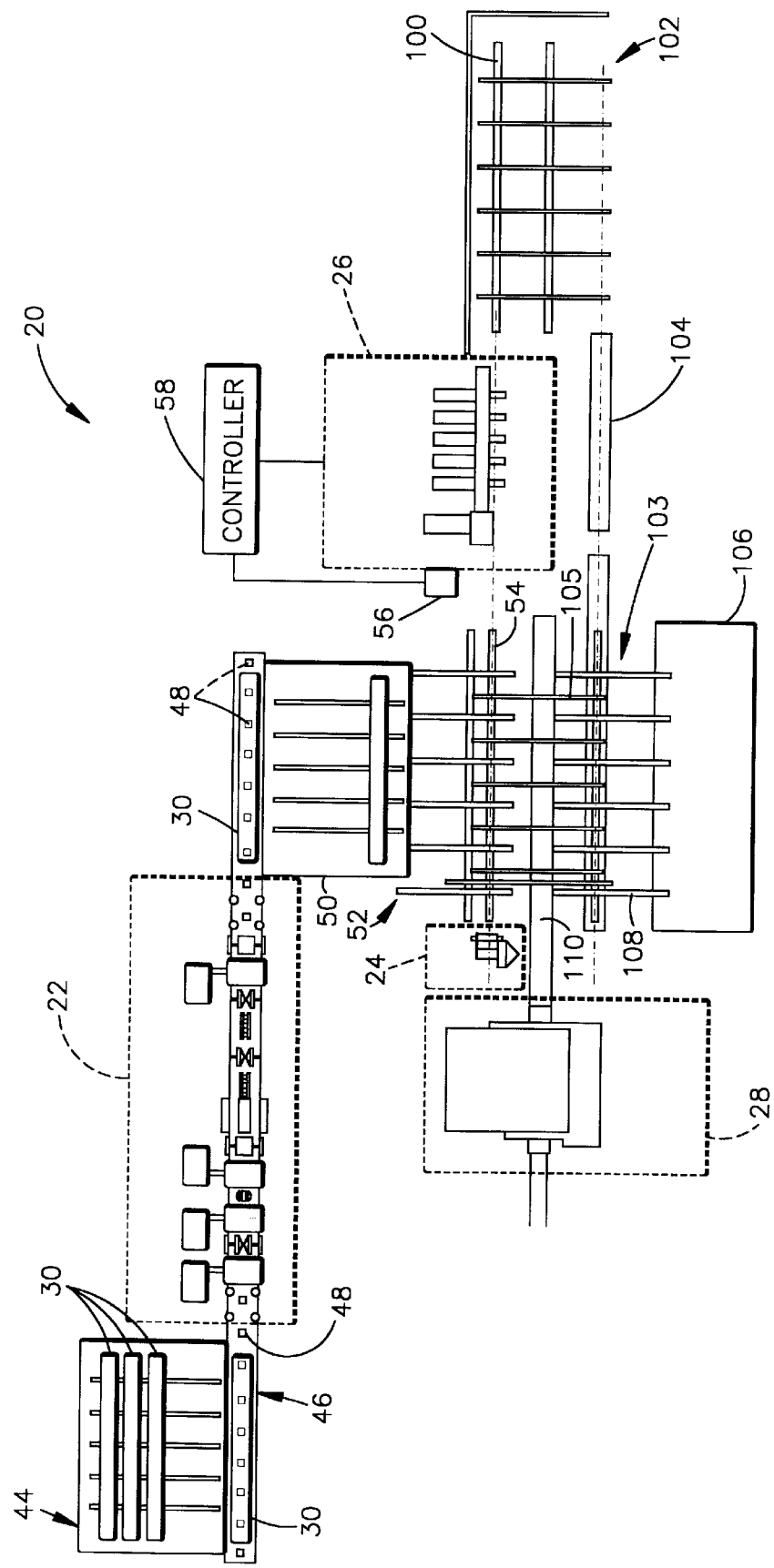
FIG. 1 is a schematic view of a production line for induction heat treating, restraint quenching, hardness testing, and roller straightening of structural members in accordance with the method and apparatus of the present invention.

Referring now to the drawings wherein the showings are for the purposes of illustrating the preferred embodiment of the invention only and not for purposes of limiting same, in FIG. 1, an apparatus 20 is shown for induction heat treating, restraint quenching, hardness testing and roller straightening truck side rail structural members. The apparatus 20 includes an induction heat treat and restraint quench apparatus 22, a hardness testing device 24, a roller straightener apparatus 26, and a shot peen apparatus 28.

Referring to FIGS. 2A–2D, a channel shaped structural member 30 has a web portion 32 which extends along a generally central longitudinal axis C. A flange 34 extends away from the web 32 in a generally perpendicular direction. A flange 36 extends away from the web 32 in a generally perpendicular direction. The web 30 and flanges 34, 36 have openings 38 that are punched, drilled or cut through them for attachment of structural elements. The outside measurement from an external surface 40 of the flange 34 to an external surface 42 of the flange 36 is in the range of $9\ 1/8$ to $12\ 1/4$ inches. Each flange 34, 36 of the channel shaped rail member 30 is preferably 3 to 4 inches in length from the web portion 32 to the end of the flange. The length of the flanges 34 and 36 generally varies along the length of the channel member 30. The structural members 30 are generally constructed of stock having a thickness of up to 0.5 inch, although more frequently the thickness is in the range of 0.25 to 0.312 inch.

The truck structural members 30 are generally made from a low alloy steel such as carbon steel. The induction heat treat and restraint quench operation 22 improves the physical properties and characteristics of the carbon steel. Generally, it is contemplated that the carbon steel will typically have the following content; carbon 0.21 to 0.30%, manganese 1.0 to 1.5%, sulfur 0.05% maximum, phosphorous 0.04% maximum. Steel that has the above content is known to those skilled in the art as SAE 1025 and SAE 1027 modified. After heat treating, the steel has a minimum yield strength of 110,000 psi and preferably has a yield strength from 100,000 psi to 130,000 psi. At strengths less than 100,000 p.s.i the rail members twist when processed through the roller straightener 26 potentially damaging the roller straightener or requiring that the twisted structural member be backed out of the straightener. The hardness of the steel after tempering is preferably in the range of 269 to 331 Brinell.

Referring to FIG. 1, structural members 30 are unloaded from a rack (not shown for clarity of illustration) onto an entry table 44. The entry table 44 feeds the structural members 30 onto an inload conveyor 46 that is operatively connected to the heat treat and quench apparatus 22. The inload conveyor 46 has individually driven conveyor rolls 48 to move the structural members 30 to the heat treat operation 22. An induction heat treat and restraint quench apparatus suitable for use in the present invention is described in U.S. Pat. No. 4,394,194 to Satava et al., entitled Method for Heat Treating Structural Members, which patent is fully incorporated herein by this reference. The structural members 30 transfer through and are processed in the heat treat coils and restraint quench as described in the above referenced and incorporated U.S. Patent. Once the structural member 30 is heat treated and quenched, it is conveyed to the ends of the conveyor rolls 48 where the structural member 30 is laterally moved onto a cooling conveyor 50. The structural member 30 is inspected by an operator at the end of the heat treat process at a cooling table and conveyor 50. The operator checks hole alignment and hole movement etc. that occurs during the induction heat treating and restraint quenching process. The structural member 30 is transferred onto the cooling conveyor 50 for cooling by ambient temperature.

The cooling conveyor 50 is proximately located to advantageously deposit the structural members 30 onto a chain conveyor 52 for transporting heat treated structural members 30 to the hardness testing apparatus 24. A device suitable for use as a hardness testing apparatus, including a printer, in the present invention is available as model number HP3000, WDS-2001 from Wilson Instruments of Canton, Mass. 02021. The structural member 30 is automatically advanced to the Brinell hardness tester 24, checked and released onto the entry conveyor into the straightener 26. The structural members 30 that meet the desired hardness specifications are marked on the web 32 of the channel shaped rail with the time and date. The structural members 30 have a residual temperature in the range of 200° F. to 300° F. Typically, the structural members are at a temperature of approximately 250° F.

An entry conveyor 54 is operatively connected to the hardness tester 24 and is advantageously adapted to automatically receive the structural member 30 after being tested and released. The entry conveyor 54 is one of any number of powered roller conveyors for conveying the structural members 30 into the roller straightener 26. The rails are transferred from the cooling conveyor 50 to the hardness testing apparatus 24 and the straightener powered entry conveyor 54 by tripping a series of limit switches (not shown for clarity in the illustration) in a known manner.

An optical sensor 56 is advantageously mounted to detect the presence of a structural member 30, which is yet to be processed in the roller straightener 26, at a predetermined position in transit on the entry conveyor 54. The optical sensor is for (i) actuating an entry pinch rollers and guide assembly 60 through a delay switch thereby grabbing the structural member by the entry pinch roll assembly and guiding it with an entry vertical guide assembly into the first set of straightener rolls, and (ii) incrementing a counter for tracking the number of structural members 30 processed through the roller straightener 26. The pinch roll disengages after the rail is in the first set of straightener rolls. It will be appreciated that other types of sensors may be used to detect the position of the structural members 30 on the entry conveyor 54.

The roller straightener 26 in the present invention is an adaptation of a hot roll structural steel forming mill. The hot rolling mill is normally used on red hot metal being formed into a structural member. In the present invention, the hot rolling mill is advantageously adapted for use to remove or reduce camber, bow and flange angle deviation of cooled, heat treated (i.e. hardened) and shaped structural members with punched openings already in the structural member. A hot metal forming mill suitable for use as a roller straightner in the present invention is model number RPsv57.5/90sp from Siemag of Dusseldorf, Germany.

Referring to FIGS. 3A–3B, the roller straightener 26 used in the present invention will be better appreciated. The roller straightener 26 includes the automated entry roll assembly 60. Any of a number of known roll assembly apparatus can be used for the roll assembly 60. For example, in a preferred embodiment, using the commercially available hot rolling mill referred to above, the entry roll assembly 60 includes automated entry pinch rolls to assist the entry conveyor 54 by pushing the structural members 30 into the roller straightener 26. The entry roll assembly 60 includes horizontal and vertical motorized entry guide roll assemblies (not shown). The vertical guide roll assembly includes two 270 mm diameter vertical guide rolls that are handwheel adjustable and mounted on a motor adjustable guide roll table unit. The horizontal guide roll assembly includes one 360 mm diameter horizontal guide roll and is handwheel adjustable mounted on the same motor adjustable guide roll table unit as the vertical guide roll assemblies. The adjustable horizontal and vertical guide rolls are driven in the preferred embodiment by 4 KW AC motor and 5.5 KW AC motors respectively. The vertical and horizontal guide roll assemblies in the entry roll assembly 60 assist in positioning the structural members 30 into the roller straightener 26.

Referring to FIGS. 4A–4B, roller straightener tooling rolls for use in the roller straightener 26 are shown. An upper roll 62 is shown in FIG. 4A and a lower tooling roll set 64 is shown in FIG. 4B. The rolls 62, 64 are specially configured having a 22 inch diameter to encompass all sizes of structural members 30 produced. The lower tooling roll set 64 is conventional in the art and is assembled for mounting on associated arbors in the roller straightener 26. The tooling roll set includes conventional components such as shims 66, center rolls 70a and 70b, tooling sleeves 72, an inboard small roll 74, an outboard small roll 76, and lock rings (not shown for clarity of illustration). The assembled lower tooling set 64 has flange receiving spaces 68a, 68b that are advantageously adapted for receiving the flanges 34, 36 of the structural members 30 that are processed through the roller straightener 26. The depth of the receiving spaces 68a, 68*b* to the arbor is specified to advantageously accommodate the flange length of the structural members being processed through the roller straightener 26. Each structural member 30 that has different web width, flange length and gauge has specifically designed rolls. The rolls 62, 64 are made from an A-2 tooling steel with a chromium nitrate finish to (i) enhance the movement of the structural members through the rolls, and (ii) keep the marking of the surface of the material to a minimum. The rolls 62, 64 are used to reduce and control camber, bow, and flange angle deviation in the structural member 30.

The roller straightener 26 includes a total of nine horizontal roll arbors 68*a*–68*i* mounted in individual motor adjustable arbor housings 69*a*–69*i* in a known manner. The rolls 62, 64 are mountable on the arbors 68*a*–68*i* in a known manner. Four of the top five arbors 68*a*, 68*c*, 68*g*, and 68*i* are (i) adjustable axially, and (ii) each driven by a 10 KW DC main drive motor and gear box mounted within the arbor housings 69*a*, 69*c*, 69*g*, 69*i*. The arbors 68*a*, 68*c*, 68*e*, 68*g*, and 68*i* have upper rolls 62 mounted to push the structural members through the roller straightener. The tooling rolls 64 are mounted on arbors 68*b*, 68*d*, 68*f*, and 68*g*. The bottom four tooling roll sets 64 mounted on the arbors 68*b*, 68*d*, 68*f*, and 68*h* are idle. The bottom four arbors 68*b*, 68*d*, 68*f*, and 68*h* are adjustable axially and vertically.

Figure 5A:
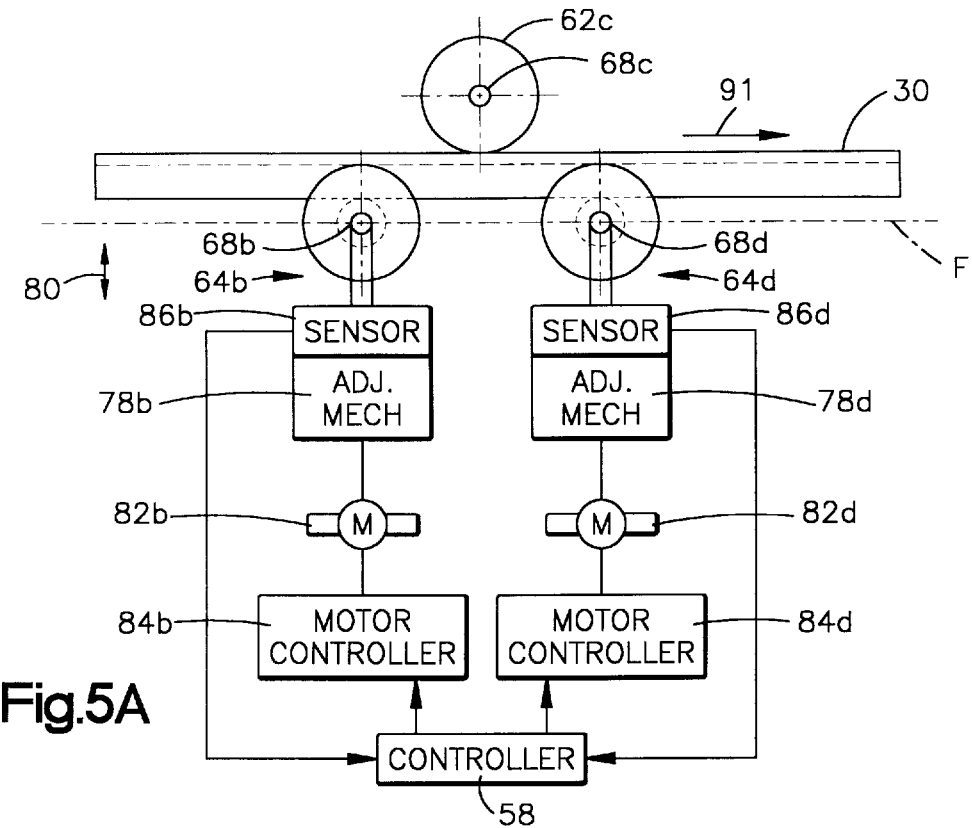
FIG. 5A is a partial schematic representation of a side view illustrating the adjustment features of the roller straightener shown in FIGS. 3A–B.
Figure 5B:
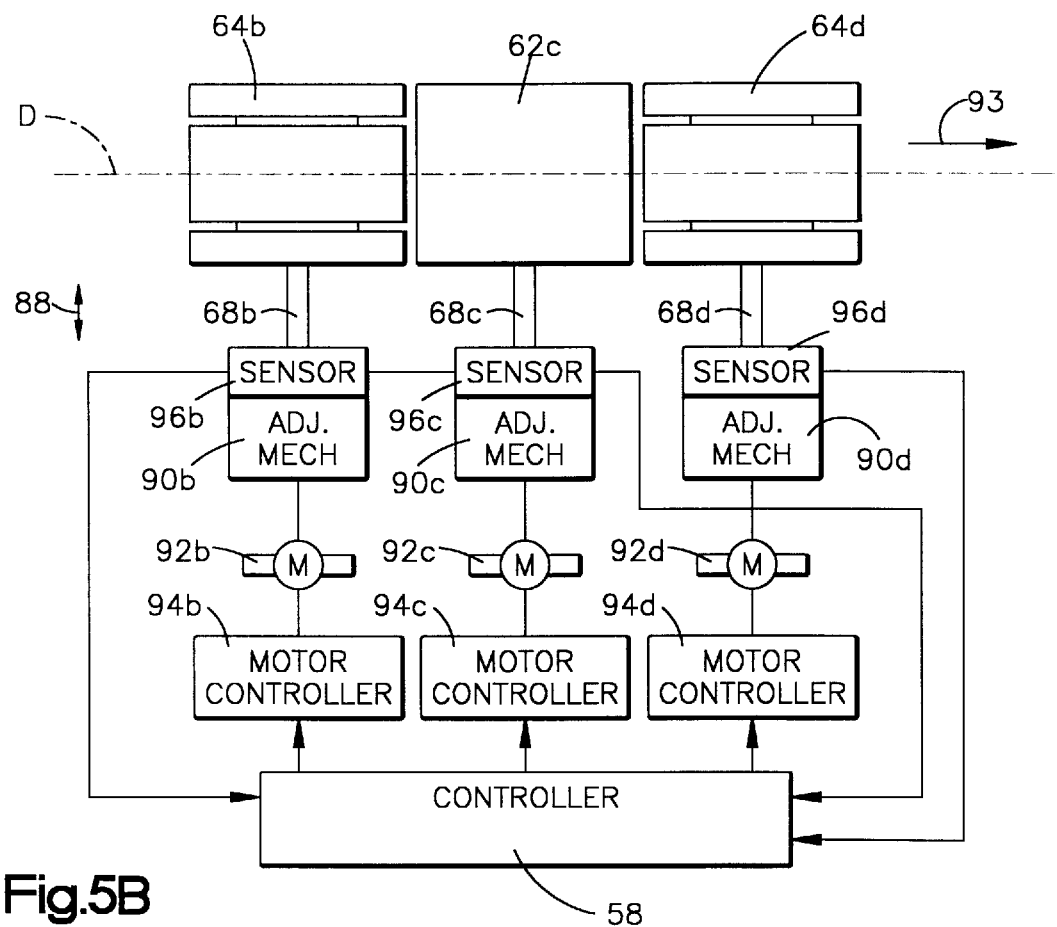
FIG. 5B is a partial schematic representation of a top view illustrating the adjustment features of rolls used in the roller straightener shown in FIGS. 3A–B.

Referring to FIGS. 5A and 5B, the axial and vertical adjustment features of the arbors 68*a*–*i* in the adjustable arbor motor housings 69*a*–*i* of the roller straightener 26 will be better appreciated. Specifically, in FIG. 5A a portion of the nine arbors and rolls is shown thereby illustrating the vertical adjustment features that is typical of all of the lower tooling roll arbors 68*b*, 68*d*, 68*f*, and 68*h*. The lower tooling roll arbors 68*b*, 68*d*, 68*f*, and 68*h* are each operatively connected, via the arbor housings 69*b*, 69*d*, 69*f*, and 69*h*, to an associated vertical adjustment mechanism 78*b*, 78*d*, 78*f*, and 78*h* for individually adjusting the arbor vertically in a bi-directional manner as shown by arrow 80. The four independent motorized bottom straightening roll vertical adjustment mechanisms 78*b*, 78*d*, 78*f*, and 78*h*, one for each bottom tooling roll contained in the bottom roll arbor housing, provide bi-directional vertical adjustment operating via tandem worm gear screw-nut assembly. Each adjustment mechanism 78*b*, 78*d*, 78*f*, 78*h* is powered by an individual screw down motor 82*b*, 82*d*, 82*f*, and 82*h*. The vertical adjustment motors 82*b*, 82*d*, 82*f*, and 82*h* are bi-directional 5.5 KW AC motors. The range of adjustment in the vertical direction along arrow 80 is ± one inch from a horizontal axis F defining a predetermined neutral vertical position common to the centers of the four lower arbors 68*b*, 68*d*, 68*f*, and 68*h*. The motors 82*b*, 82*d*, 82*f*, and 82*h* are each controllably connected to an associated individual motor controller 84*b*, 84*d*, 84*f*, and 84*h*. The motor controllers 84*b*, 84*d*, 84*f*, and 84*h* are in data communication with a controller 58. Preferably, the controller 58 is a microcontroller having a central processing unit and associated memory as is known in the art. Position sensors 86*b*, 86*d*, 86*f*, and 86*h* are operatively connected to the adjustment mechanisms 78*b*, 78*d*, 78*f*, and 78*h*. The sensors 86*b*, 86*d*, 86*f*, and 86*h* are in data communication with the controller 58. The sensors 86*b*, 86*d*, 86*f*, and 86*h* each provide a signal indicative of the position of the center of the associated arbor relative to the axis F. Any of a number of sensor types may be used for providing the position signal, for example a potentiometer, a linear variable differential transformer, and an optical sensor can be used. An arrow 91 indicates the direction of travel for a structural member through the roller straightener 26.

Referring to FIG. 5B, the axial adjustment features of the present invention will be better understood. Each of the nine arbors 68*a*–*i* are adjustable axially in a direction generally perpendicular to the axis D, which is (i) generally parallel to the direction of travel of a structural member 30 through the straightener 26 as shown by an arrow 93, and (ii) defines a predetermined neutral axial position common to the centerline of travel of the structural members 30 through the rolls 62*a*–*e* and 64*a*–*d* that are operatively mounted on the arbors 68*a*–*i*. The range of adjustment in the axial direction as shown by an arrow 88 is ± one inch from the axis D. A portion of the nine arbors and rolls is shown in FIG. 5B thereby illustrating the axial adjustment feature that is typical of all of the roll arbors 68*a*–*i*. The drive motors, operatively connected to the arbors 68*a*, 68*c*, 68*g*, and 68*i*, for powering the structural member 30 through the roller straightener are not shown (for clarity of illustration). The roll arbors 68*a*–*i* are each operatively connected, via the associated arbor housing 69*a*–*i* to an associated axial adjustment mechanism 90*a*–*i* for individually adjusting the arbor axially in a bi-directional manner as shown by arrow 88. The nine independent motorized roll axial adjustment mechanisms 90*a*–*i*, one for each arbor housing, provide bi-directional axial adjustment operating via any of a number of known gear assembly arrangements. Each axial adjustment mechanism 90*a*–*i* is powered by an individual motor 92*a*–*i*. The axial adjustment motors 92*a*–*i* are bi-directional 2.2 KW AC motors. The range of bi-directional adjustment in the axial direction along arrow 88 is ± one inch from the axis D which defines a predetermined neutral axial position common to the arbors 68*a*–*i*. The motors 92*a*–*i* are each controllably connected to an associated individual motor controller 94*a*–*i*. The motor controllers 94*a*–*i* are in data communication with the controller 58. Position sensors 96*a*–*i* are operatively connected to the adjustment mechanisms 90*a*–*i*. The sensors 96*a*–*i* are in data communication with the controller 58. The sensors 96*a*–*i* each provide a signal indicative of the position of the associated arbor relative to the axis D. Any of a number of sensors may be used for providing the position signal, for example a potentiometer, a linear variable differential transformer, and an optical sensor can be used.

The hot roll mill originally included a system that allowed the pitch or horizontal distance between the straightening rolls to be adjusted. However, the processing of the structural members caused the arbors to shift such that the arbors were not perpendicular to the direction of travel shown by the arrow 93 of the structural member along the axis D. The drive motors for the arbors 68*a*–*i* are locked in place by placing permanent blocks to prevent movement of the arbors and rolls thus maintaining an orthogonal relationship between the arbors 68*a*–*i* and the direction of travel of the structural member through the roller straightener. In addition, the original horizontal spacing between the motors of the top rolls 68*a*, 68*c*, 68*e*, 68*g*, and 68*i* was 22 inches. The spacing between rolls 68*a* and 68*c* is changed to 34 inches to relieve mechanical, and electrical, load on these two motors. The drive motors on arbors 68*a*, 68*c*, 68*g*, and 68*i* are each 10 horsepower AC motors. Recall that the center top arbor 68*e* and the lower arbors 68*b*, 68*d*, 68*f*, and 68*h* are not powered.

Referring again to FIG. 1, as the structural member 30 enters the roller straightener 26 an automated mist system (not shown for clarity of illustration) provides a lubricant to the structural member 30 to facilitate the processing of the hardened member through the tooling rolls of the straightener.

Referring to FIGS. 3A–3B, as the structural member 30 exits the roller straightener 26 the member 30 enters an automated exit roll assembly 98. Any of a number of known roll assembly apparatus can be used for the exit roll assembly 98. For example, in a preferred embodiment using the commercially available hot rolling mill referred to above, the exit roll assembly 98 includes automated exit pinch rolls to transport the structural member 30 to a powered exit conveyor 100. The exit roll assembly 98 includes horizontal and vertical motorized entry guide roll assemblies (not shown). The vertical guide roll assembly includes two 270 mm diameter vertical guide rolls that are handwheel adjustable and mounted on a motor adjustable guide roll table unit. The horizontal guide roll assembly includes one 360 mm diameter horizontal guide roll and is handwheel adjustable mounted on the same motor adjustable guide roll table unit as the vertical guide roll assemblies. The adjustable horizontal and vertical guide rolls are driven by 4 KW AC motor and 5.5 KW AC motors respectively. The vertical and horizontal guide roll assemblies in the exit roll assembly 98 assist pushing the structural members 30 onto the powered exit conveyor 100.

The powered exit conveyor 100 moves finished/ straightened structural members 30 from the straightener 26. A powered chain transfer conveyor 102 is advantageously located adjacent to the exit conveyor 100 for receiving the straightened structural members and transporting them in a known manner to a powered conveyor 104. The powered conveyor 104 conveys the structural member to an inspection station 103. The structural members are manually inspected for bow, camber, and flange angle deviation. The inspectors then send the structural member to (i) the next process via a chain conveyor 105, or (ii) the rework storage area 106 via a chain conveyor 108.

The chain conveyor 105 deposits structural members that pass inspection on a shot peen conveyor 110. The structural member 30 is automatically processed through the shot peen system 28 for hardening and adding compressive stress to the structural member 30 to improve fatigue life of the member. A shotpeen apparatus suitable for use in the present invention is model number ES-1842-8510 manufactured by Pangborn of Hagerstown, Md. 21741.

Referring again to FIGS. 2A–2D, a typical structural member is shown. As described above, induction heat treating and quenching structural members results in distortion of the structural member. The heat treated structural members develop bow distortion, camber distortion, and flange angle distortion. These distortions inhibit the mounting of apparatus to the structural members using the apertures punched in the member prior to tempering. Some distortion is localized in the structural member. Depending on the total length of the structural member, size, and shape of the apertures and flange modifications, localized bowing may vary between specific product lines. For example, a 40 ft. structural member having numerous and variously shaped apertures and flange modifications will have different typical local distortion characteristics that a 9 ft. structural member with few apertures and flange modifications. Each of the different product lines of structural members requires changes to the adjustable axial and vertical positions of the different rolls in the roller straightener to remove the distortions in the structural member. Thus, the vertical position and the axial position for each roll may be different for each different product line of structural member to be processed through the roller straightener.

The desired axial and vertical position settings for each adjustable feature of each roll is determined empirically. A heat treated structural member 30 for a particular product line is processed through the roller straightener 26 with the roll positions at preselected axial and vertical positions. After the structural member is processed it is inspected for bow, camber and flange angle distortion. Axial and vertical position adjustments are made to the rolls and structural members are processed until the structural members which have completed processing in the straightener are within specification. The axial and vertical position settings for each of the adjustable features of each roll are then stored in the memory of the controller 58 for the particular product line. The stored positions for all of the rolls for a particular product line is called a "recipe."

Figure 6:
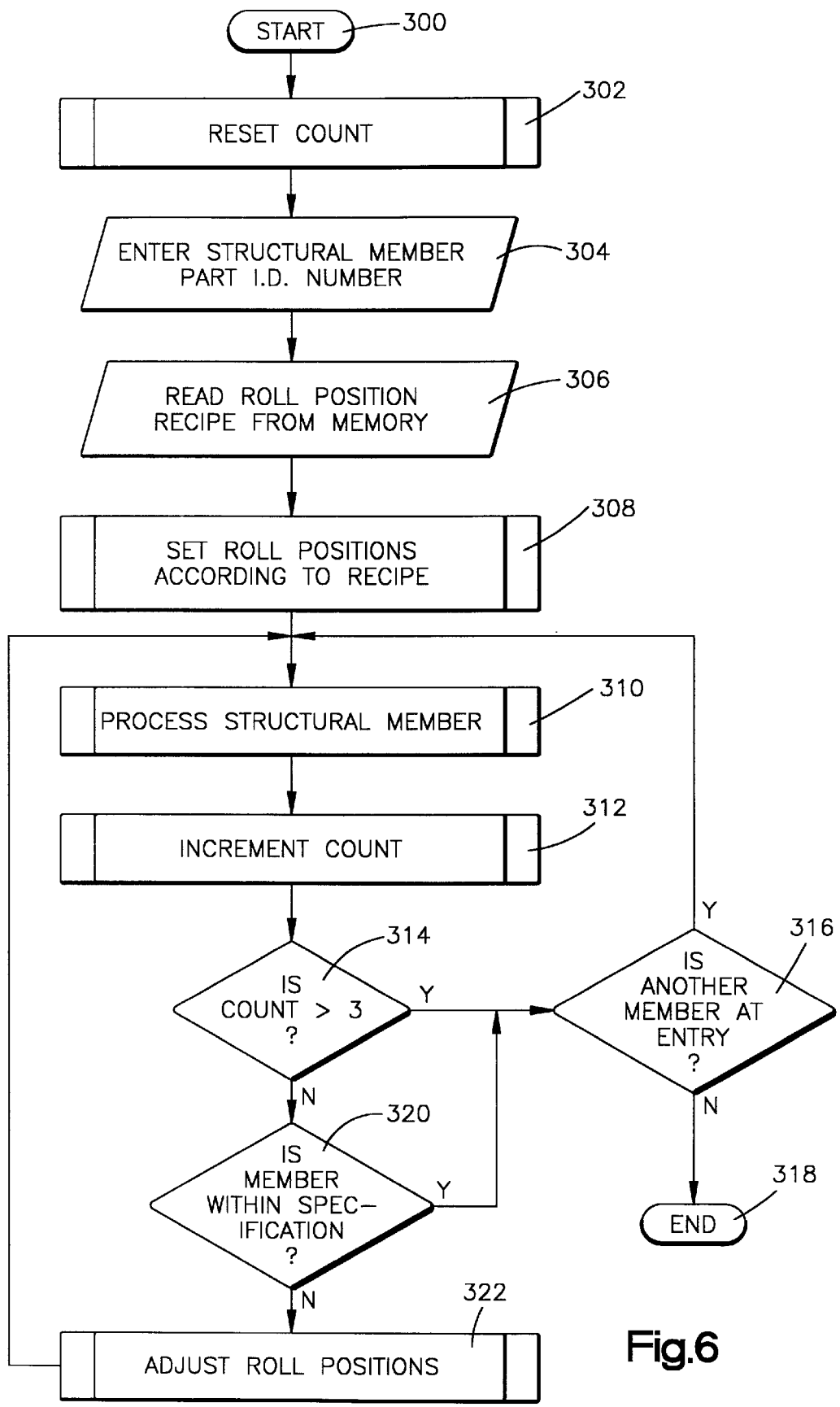
FIG. 6 is a flow diagram illustrating a part of the control process of the present invention.

Referring to FIG. 6, the control process of the roller straightener 26 in the present invention will be better appreciated. The control process is initiated in step 300 where internal memories and timers are reset. In step 302, a counter (not shown) internal to the controller 58 is reset. Next, in step 304, the product line identification number of the particular product line of structural members to be processed is entered into the controller 58. In step 306, the controller 58 reads the "recipe" of roll positions associated with the product line identified in step 304. Next, in step 308, the positions of the rolls are set according to the recalled "recipe." In step 310, a first heat treated structural member is processed through the roller straightener 26. The internal counter is incremented in step 312. In step 314, a determination is made as to whether the count is greater than three. If the determination in step 314 is negative, thereby indicating that the count is less than or equal to three, the process continues on to step 320. In step 320, a determination is made as to whether the structural member is within specification. An operator measures the distortions in the structural member. If determination in step 320 is affirmative, indicating that the structural member is within specification, the operator enters into the controller an indication that the structural member is within specification and the process proceeds to step 316. If the determination in step 320 is negative, indicating that the structural member is not within specification, the process proceeds to step 322. In step 322, the positions of the rolls are adjusted, based on empirically acquired data for the specified product line, to move the rolls into positions that are likely to produce structural members within customer specification. The process then returns to step 310 to process the next structural member yet to be processed. If the determination in step 314 is affirmative, indicating the number of structural members processed is greater than three, the process proceeds to step 316. In step 316, a determination is made as to whether the photo sensor at the entry of the roller straightener indicates the presence of another rail yet to be processed. If the determination is negative, the process proceeds to step 318 where the procedure ends. If the determination in step 316 is affirmative, indicating that another structural member is ready to be processed, the process returns to step 310.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An apparatus for induction heat treating, restraint quenching, and straightening an associated structural member, said associated structural member having a web and at least one flange substantially perpendicular thereto, said apparatus comprising:

heat treating means for induction heating and restraint quenching said associated structural member, said heat treating means operatively connected to a cooling conveyor and adapted for receiving said associated structural member from said heat treating means;

conveyor means adapted for receiving said associated structural member; and roller straightener means operatively connected to said conveyor means and adapted for receiving said associated structural member from said conveyor means and conveying said associated structural member generally along a travel axis, said roller straightener means including:

a plurality of rolls proximately located to one another for operatively engaging said associated structural member between said rolls, and first adjustment means for adjusting the position of at least one of said rolls along a vertical axis generally perpendicular to the travel axis, and second adjustment means for adjusting the position of at least one of said rolls along a roller axis generally perpendicular to the travel axis and the vertical axis.

2. The apparatus of claim 1 wherein said first adjustment means includes means for adjusting the position of at least one of said rolls along said vertical axis within a range of ±one inch.

3. The apparatus of claim 1 wherein said roller straightener means further includes testing means for hardness testing said heat treated associated structural member, said testing means adapted for receiving said associated structural member from said cooling conveyor.

4. The apparatus of claim 1 wherein said second adjustment means includes means for adjusting the position of at least one of said rolls along said axial axis within a range of ±25 mm from the travel axis wherein the travel axis is generally parallel to the direction of movement of said associated structural member during straightening in said roller straightener.

5. The apparatus of claim 1 wherein said straightener means further includes:

sensor means for sensing the position of said at least one roll relative to said vertical axis and said axial axis, said sensor means transmitting a position signal, and controller means adapted to receive the position signal and provide a control signal to said first and second adjustment means.

6. The apparatus of claim 5 wherein said controller means includes memory means for storing data representative of one of a plurality of predetermined positions of at least one of said rolls along said vertical axis.

7. The apparatus of claim 6 wherein said apparatus further includes position adjustment means for adjusting the position of at least one of said rolls along said vertical axis in response to said stored data.

8. The apparatus of claim 3 wherein said testing means is a Brinell hardness testing means.

9. The apparatus of claim 1 further including means for surface hardening said associated structural member by introducing compressive stress in the associated structural member.

10. The apparatus of claim 9 wherein said means for surface hardening comprises means for shot peening said associated structural member.

11. An apparatus according to claim 1, wherein at least one roll located above said structural member is adjustable along said axial axis by said second adjustment means.

12. An apparatus according to claim 1, wherein at least one roll located below said structural member is adjustable along said axial axis by said second adjustment means.

13. An apparatus according to claim 1, wherein said first adjustment means adjusts the position of a plurality of said rolls along the vertical axis, and said second adjustment means adjusts the position of a plurality of said rolls along the axial axis.

* * * * *